(12) United States Patent
Tamemasa

(10) Patent No.: US 12,098,691 B2
(45) Date of Patent: Sep. 24, 2024

(54) COMBUSTOR FOR ROCKET ENGINE AND METHOD FOR MANUFACTURING IT

(71) Applicant: Interstellar Technologies Inc., Hokkaido (JP)

(72) Inventor: Hiroshi Tamemasa, Hokkaido (JP)

(73) Assignee: Interstellar Technologies Inc., Hokkaido (JP)

( * ) Notice: Subject to any disclaimer, the term of this patent is extended or adjusted under 35 U.S.C. 154(b) by 0 days.

(21) Appl. No.: 17/972,680

(22) Filed: Oct. 25, 2022

(65) Prior Publication Data

US 2023/0125860 A1    Apr. 27, 2023

(30) Foreign Application Priority Data

Oct. 27, 2021    (JP) ................................ 2021-175814

(51) Int. Cl.
   *F02K 9/64*    (2006.01)
   *B23P 15/00*    (2006.01)
   *F02K 9/97*    (2006.01)

(52) U.S. Cl.
   CPC .............. *F02K 9/64* (2013.01); *B23P 15/008* (2013.01); *F02K 9/972* (2013.01)

(58) Field of Classification Search
   CPC ... F02K 9/62; F02K 9/64; F02K 9/972; B23P 15/008
   See application file for complete search history.

(56) References Cited

U.S. PATENT DOCUMENTS

| 2,933,888 | A | * | 4/1960 | Africano | F02K 9/972 |
| | | | | | 60/770 |
| 2,943,442 | A | * | 7/1960 | Baehr | F02K 9/64 |
| | | | | | 431/243 |
| 3,162,012 | A | * | 12/1964 | Blaze | F02K 9/64 |
| | | | | | 239/127.1 |
| 3,798,902 | A | * | 3/1974 | Butter | F02K 9/64 |
| | | | | | 60/260 |
| 5,874,015 | A | * | 2/1999 | Mittendorf | C22C 47/064 |
| | | | | | 216/100 |
| 2004/0093852 | A1 | | 5/2004 | Fint et al. | |
| 2005/0188678 | A1 | | 9/2005 | Haggander | |
| 2012/0060464 | A1 | * | 3/2012 | Grote | F02K 9/972 |
| | | | | | 60/206 |
| 2012/0261104 | A1 | * | 10/2012 | Kelly | B23K 20/02 |
| | | | | | 165/177 |

FOREIGN PATENT DOCUMENTS

| CN | 109357577 A | 2/2019 |
| CN | 209145735 U | 7/2019 |

(Continued)

*Primary Examiner* — Kyle Robert Thomas
(74) *Attorney, Agent, or Firm* — Myers Wolin, LLC

(57) ABSTRACT

A combustor which can be manufactured without requiring large-scale equipment and with a small number of processes and has a cooling fluid flow path sealed with high reliability. The combustor includes an inner cylinder made of metal constituting a combustion chamber, a cooling fluid flow path formed on an outer surface of the inner cylinder, and a sealing layer covering the outer surface of the inner cylinder to seal the cooling fluid flow path. The sealing layer is constituted by a bonded body of metal wires wound around the outer surface of the inner cylinder and metallurgically bonded to each other, and the sealing layer is bonded to the outer surface of the inner cylinder by metallurgical bonding.

12 Claims, 12 Drawing Sheets

(56) References Cited

FOREIGN PATENT DOCUMENTS

| | | | |
|---|---|---|---|
| JP | 2004-169702 | A | 6/2004 |
| JP | 2005-513322 | A | 5/2005 |
| JP | 2010-64099 | A | 3/2010 |

\* cited by examiner

COMBUSTOR FOR ROCKET ENGINE AND METHOD FOR MANUFACTURING IT

CROSS-REFERENCE TO RELATED APPLICATION

The present application claims priority under 35 U.S.C. § 119 to Japanese Patent Application No. 2021-175814, filed Oct. 27, 2021, the contents of which application are incorporated herein by reference in their entirety.

FIELD

The present disclosure relates to a combustor for a rocket engine and a method of manufacturing it, and more particularly to a combustor suitable to be used in a regeneratively cooled combustor and a method of manufacturing it.

BACKGROUND ART

JP2005-513322A discloses a structure of a conventional rocket engine comprising a combustion chamber and a nozzle. Fuel mixed with an oxidizing agent burns in the combustion chamber. Typically, the temperature in the combustion chamber reaches 5000 to 6000 degrees F. and the pressure in the combustion chamber reaches 1000 to 4000 pounds at the time of the burning. The high-temperature and high-pressure gas generated in the combustion chamber expands in the nozzle and is discharged rearward to give the rocket propulsive force. Generally, all or part of the upper structure of the nozzle is integrated with the combustion chamber. In this specification, a component of a rocket engine that is a combustion chamber with which all or part of a nozzle is integrated is referred to as a combustor.

During the operation of the rocket engine, the interior space of the combustor is exposed to high temperature. Therefore, it is essential for the combustor to cool the walls forming the interior space. As a method for cooling the wall of the combustor, it is general forming a flow path inside the wall and making cooling fluid flow through the flow path to exchange heat with the wall. In the case of a regeneratively cooled combustor, liquid fuel is generally used as the cooling fluid.

As a conventional method for providing the cooling fluid flow path in the wall of the combustor, it is known first forming a groove, which is the cooling fluid flow path, on an outer surface of inner wall material (inner cylinder) by mechanical cutting, and then sealing the cooling fluid flow path by plating the outer surface of the inner wall material by an electroforming method. In this method, the plate covering the outer surface of the inner wall material works as an outer cylinder. However, the plating process is very labor-intensive and requires several critical operations. As a result, in manufacturing processing of a combustor having a typically designed shape, rework has been required at a considerable frequency.

Specifically, during the process of sealing the cooling fluid flow path, the cooling fluid flow path is filled with wax material. The exposed outer surface of the inner wall material is polished with silver powder to form a surface that is conductive and capable of being plated. The surface is plated with a hydrogen barrier and then plated with nickel to form a closed structure that resists the pressure of the cooling fluid. As described above, several plating processes and several intermediate machining processes are required to seal the cooling fluid flow path. In addition, all plating processes have problems about a chemical solution used in plating and other parameters of the processes, as well as contamination that reduces the bonding strength of the plated material. If an anomaly occurs before the completion, the material plated on the cooling fluid flow path must be removed by machining and the plating process must be repeated. Therefore, the conventional method in which the cooling fluid flow path is sealed by the plating requires a lot of time and labor until the completion resulting in high manufacturing costs.

In addition, the conventional method described above requires the process of removing the wax material from the cooling fluid flow path following the completion of the plating process. This is because presence of residual wax material can cause contamination in a subsequent operation. Therefore, the conventional method described above costs a lot of time and labor also to remove the wax material.

As it is disclosed in JP2004-169702A, another method is also known as a method for providing the cooling fluid flow path in the wall of the combustor. According to the method disclosed in JP2004-169702A, a groove, which is a cooling fluid flow path, is formed on the outer surface of the inner cylinder, and an outer cylinder is brazed or diffusion-bonded to the inner cylinder. A hot isostatic pressing method (hereinafter abbreviated to HIP) is used to bring both members into close contact at the time of bonding. The HIP is a technique of a pressurizing process using gas such as water or argon as a pressurizing medium, and using a synergistic effect between a high isotropic pressure usually equal to or higher than 98 MPa (1000 kgf/cm2) and a temperature equal to or higher than 1000 degrees C.

However, since large-scale equipment is required for a process using HIP, the method disclosed in JP2004-169702A requires high equipment costs and high manufacturing costs. Further, since the outer cylinder is processed being divided into two parts, it is also a problem that cooling fluid or combustion gas is likely to leak due to a failure in bonding the mating surfaces.

On the other hand, JP2010-064099A discloses another method different from the electroforming method or the method using HIP described above. According to the method disclosed in JP2010-064099A, a jig shaped using carbon composite material (hereinafter abbreviated to C/C material) is used as a diffusion-bonding jig to diffusion-bond the inner cylinder and the outer cylinder. The diffusion-bonding jig comprises a pair of holding members for holding a diffusion-bonded body to be diffusion-bonded and a connecting member for connecting the holding members, and at least the connecting member is made of C/C material. Since the C/C material has an extremely small rate of thermal expansion, a sufficient bonding pressure can be obtained because of the difference in rate of thermal expansion between a bonded member and the diffusion-bonding jig.

According to the method disclosed in JP2010-064099A, it is necessary to accurately align the outer cylinder with the inner cylinder on which a groove being a cooling fluid flow path is formed by mechanical cutting or the like. However, it is difficult to accurately process these two components shaped with curved surface, and there is a problem that a failure in bonding occurs when a gap is generated between these components. Further, similarly to the method disclosed in JP2004-169702A, there is also a problem that cooling fluid or combustion gas is likely to leak due to a failure in bonding the mating surfaces of the outer cylinder divided in two parts.

SUMMARY

The present disclosure is made in view of the above-described problems. The first object thereof is to provide a combustor which can be manufactured without requiring large-scale equipment and with a small number of processes and has a cooling fluid flow path sealed with high reliability. The second object of the present disclosure is to provide a method for manufacturing a combustor having a cooling fluid flow path sealed with high reliability without requiring large-scale equipment and with a small number of processes.

A combustor for a rocket engine provided by the present disclosure comprises an inner cylinder made of metal constituting a combustion chamber, a cooling fluid flow path formed on an outer surface of the inner cylinder, and a sealing layer covering the outer surface of the inner cylinder to seal the cooling fluid flow path. The sealing layer is constituted by a bonded body being bonded by metallurgical bonding of metal wires wound around the outer surface of the inner cylinder and is bonded to the outer surface of the inner cylinder by the metallurgical bonding.

According to the combustor for a rocket engine of the present disclosure, the metallurgical bonding may be diffusion bonding or brazing. The combustor for a rocket engine of the present disclosure may further comprise an outer cylinder adhering to a surface of the sealing layer to hold the inner cylinder.

The first method for manufacturing a combustor for a rocket engine provided by the present disclosure comprises forming a cooling fluid flow path on an outer surface of an inner cylinder made of metal constituting a combustion chamber, winding metal wires around the outer surface of the inner cylinder, and sealing the cooling fluid flow path by heating the inner cylinder, around which the metal wires are wound, to a temperature equal to or higher than a diffusion temperature of the metal wires to diffusion-bond the metal wires to each other and diffusion-bond the metal wires and the inner cylinder.

The second method for manufacturing a combustor for a rocket engine provided by the present disclosure comprises forming a cooling fluid flow path on an outer surface of an inner cylinder made of metal constituting a combustion chamber, sticking solder material to at least one of the outer surface of the inner cylinder and metal wires, winding the metal wires around the outer surface of the inner cylinder, and sealing the cooling fluid flow path by heating the inner cylinder, around which the metal wires are wound, to a temperature equal to or higher than a melting temperature of the solder material to braze the metal wires to each other and braze the metal wires and the inner cylinder.

The first method and the second method may further comprise forming a continuous groove on the outer surface of the inner cylinder for guiding the metal wires.

As described above, the combustor for a rocket engine according to the present disclosure comprises the sealing layer which is constituted by a bonded body being bonded by metallurgically bonding the metal wires wound around the outer surface of the inner cylinder and is metallurgically bonded to the outer surface of the inner cylinder. Since the metallurgical bonding does not require large-scale equipment and requires less processes compared to the electro-forming method or the HIP, the combustor for a rocket engine of the present disclosure can reduce manufacturing costs. In addition, since the cooling fluid flow path is sealed with high reliability by the sealing layer formed as described above, the cooling fluid is less likely to leak. According to the first method and the second method, it is possible to manufacture the combustor having the cooling fluid flow path sealed with high reliability without requiring large-scale equipment and with a small number of processes.

DETAILED DESCRIPTION

Hereinafter, embodiments of the present disclosure are described with reference to the accompanying drawings. Hereinafter, in embodiments described below, when a number like a number of a certain thing, quantity, amount, range, or the like of each element is referred to, the idea relating to the present disclosure is not limited to the number referred to, except when it is particularly clarified, or the number is clearly specified in principle. In addition, the structure and the like in the embodiments described below are not necessarily essential to the idea relating to the present disclosure, except when particularly clarified or explicitly specified in principle.

1. Overview

Figure 1:
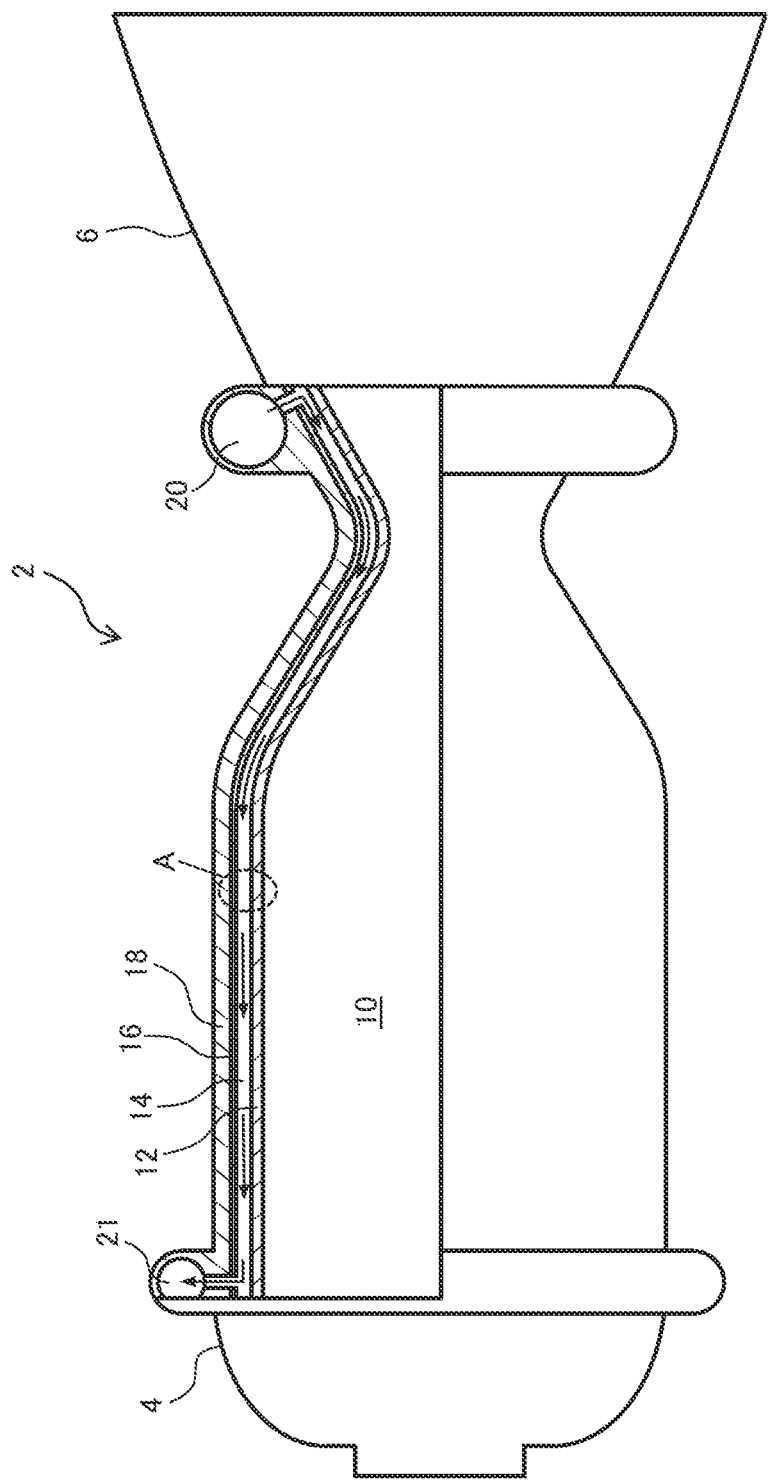
FIG. 1 is a diagram showing an example of a configuration of a combustor to which the present disclosure is applied.

The present disclosure is applied to, for example, a regeneratively cooled combustor 4 schematically shown in FIG. 1. The combustor 4 is a component constituting a rocket engine 2, and a nozzle 6 is attached to an exhaust port of the combustor 4. The rocket engine 2, which comprises the combustor 4, to which the present disclosure is applied, may be a single-stage rocket engine or a multi-stage rocket engine. For example, in a case of a two-stage rocket, the rocket engine 2 may be the first stage engine or the second stage engine. The propulsive force of the rocket engine 2 comprising the combustor 4, to which the present disclosure is applied, is not particularly limited. For example, 10 kN to 100 kN is one of suitable range of the propulsive force.

The combustor 4 comprises an inner cylinder 12 constituting a combustion chamber 10 and an outer cylinder 18 attached to the outside of the inner cylinder 12. The inner cylinder 12 is made of metal. A cooling fluid flow path 14 is formed inside the wall of the inner cylinder 12. A large number of cooling fluid flow paths 14 are formed from the rear end toward the front end of the combustor 4 at equal intervals around the entire circumference of the inner cylinder 12. Each cooling fluid flow path 14 is connected to doughnut-shaped manifolds 20 and 21 formed at a rear end and a front end of the outer cylinder 18 respectively. The manifold 20 at the rear end supplies the cooling fluid flow path 14 with liquid fuel having high pressure as cooling fluid. The cooling fluid flows through the cooling fluid flow path 14 exchanging heat with the wall of the inner cylinder 12 and is collected by the manifold 21 at the front end. The cooling fluid collected by the manifold 21 at the front end is jetted inside the combustion chamber 10 together with an oxidizing agent supplied from an injector, which is not shown in the drawings, attached to the front end of the combustor 4 through a separated system.

Specifically, the cooling fluid flow path 14 is a groove formed on an outer surface of the inner cylinder 12 and is sealed by a sealing layer 16 covering the outer surface of the inner cylinder 12. According to the combustor 4, to which the present disclosure is applied, the sealing layer 16 works as a sealing member that prevents the cooling fluid from leaking from the cooling fluid flow path 14. The outer cylinder 18 adheres to a surface of the sealing layer 16 to hold the inner cylinder 12 and protect the sealing layer 16 from the pressure of the cooling fluid flowing through the cooling fluid flow path 14. The outer cylinder 18 is made of metal such as, for example, stainless steel. A method for manufacturing the outer cylinder 18 is not limited, and it may be manufactured by, for example, a bisection method by machining, an integrated layer building method by plating or spraying, or the like. Since the outer cylinder 18 is not required to work as a sealing member, the cooling fluid is not likely to leak from the mating surfaces even when the outer cylinder 18 is formed by two parts.

Figure 2:
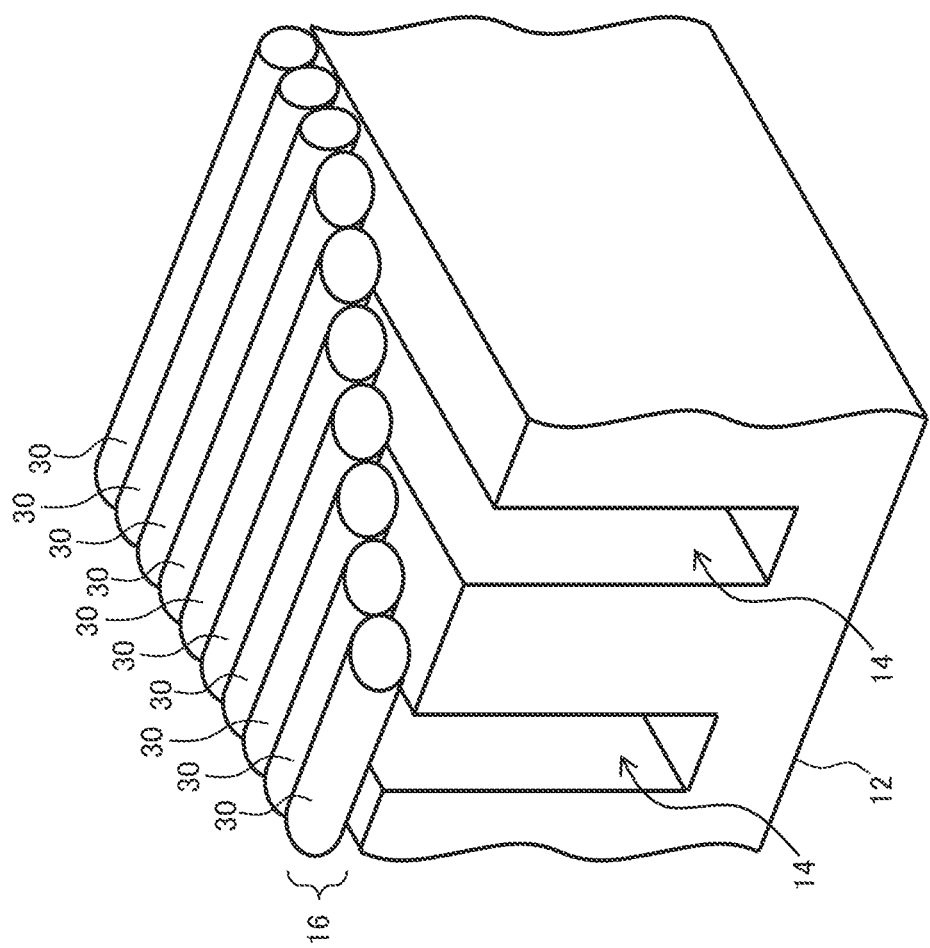
FIG. 2 is a schematic diagram to explain an outline of a sealing layer of a combustor to which the present disclosure is applied.

FIG. 2 is a schematic diagram to explain an outline of the sealing layer 16 of the combustor 4, to which the present disclosure is applied. A configuration shown in FIG. 2 corresponds to a configuration of A in FIG. 1. As shown in FIG. 2, the cooling fluid flow path 14 is a groove formed on the outer surface of the inner cylinder 12. A cross-sectional shape of the cooling fluid flow path 14 is a vertical rectangle whose long side is oriented the radial direction of the inner cylinder 12. In one example, the depth of the cooling fluid flow path 14 is five to ten times as long as the width.

According to the combustor 4, to which the present disclosure is applied, an opening of the cooling fluid flow path 14 is covered with metal wires 30 wound around the outer surface of the inner cylinder 12 without a gap in a circumferential direction. However, in the example shown in FIG. 2, some of the metal wires 30 are obliquely cut in the middle in order to clearly show how the cooling fluid flow path 14 is covered by the metal wires 30.

The metal wires 30 may be made of any material, but it is preferable that material close to the material of the inner cylinder 12 is selected, and it is particularly preferable that the same material as the material of the inner cylinder 12 is selected. This is because a brittle intermetallic compound may be possibly generated by a heat process depending on the combination of the material of the metal wires 30 and the material of the inner cylinder 12.

Likewise, the cross-sectional shape of a metal wire 30 is not limited to any shape. While metal wires 30 whose cross-sectional shapes are circles are used in the example shown in FIG. 2, the cross-sectional shape of a metal wire may be, for example, a flat circle, an ellipse, a triangle, a quadrangle, a polygon having five or more vertexes, or the like. However, thickness of a metal wire 30 has suitable range. The suitable range is described in a following embodiment.

Figure 3:
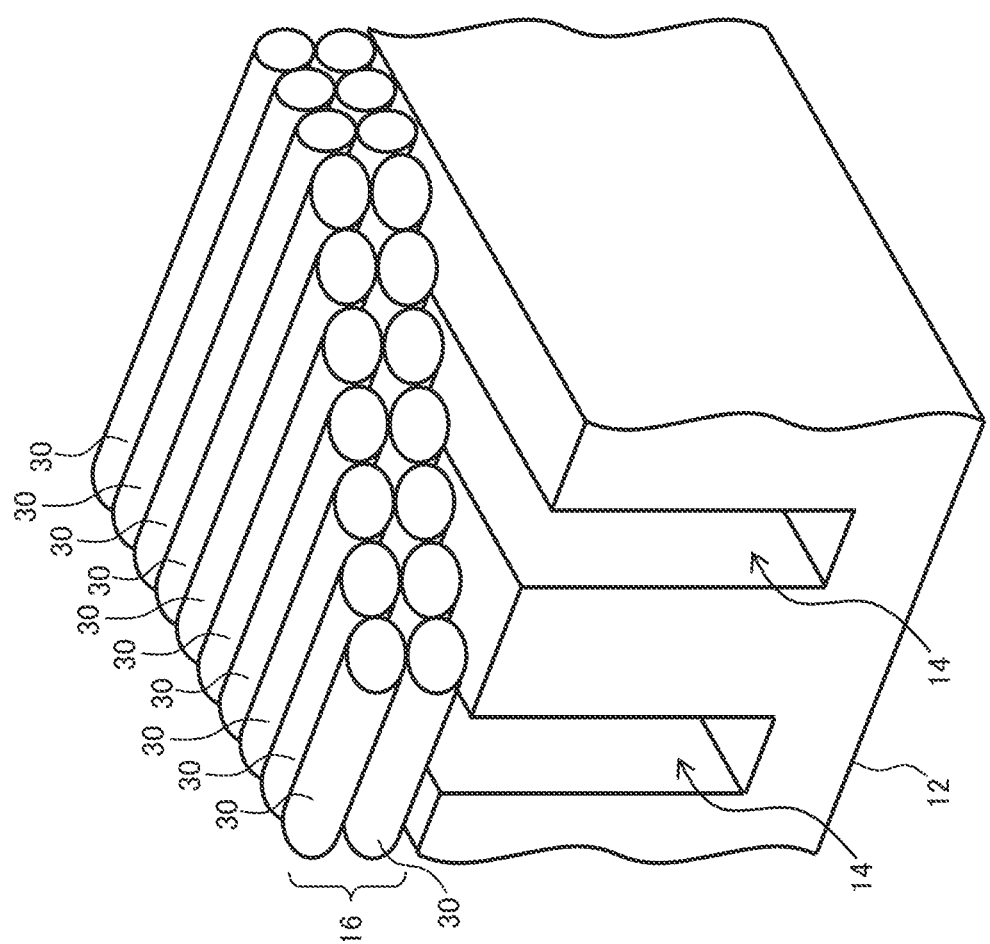
FIG. 3 is a schematic diagram to explain an outline of a sealing layer of a combustor to which the present disclosure is applied.
Figure 4:
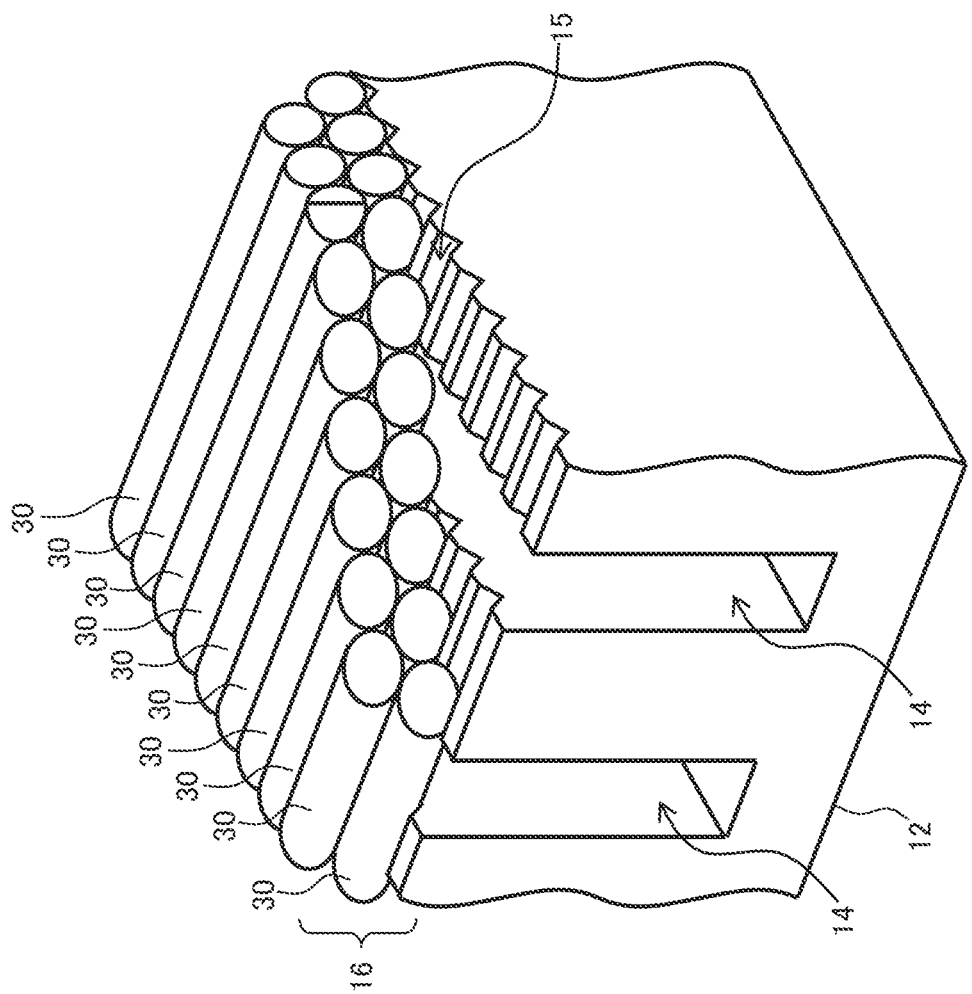
FIG. 4 is a schematic diagram to explain an outline of a sealing layer of a combustor to which the present disclosure is applied.

While the metal wires 30 are wound in a single layer in the example shown in FIG. 2, the metal wires 30 may be wound in multiple layers in order to more reliably cover the opening of the cooling fluid flow path 14. In the example shown in FIG. 3, the metal wires 30 are wound in two layers with a metal wire 30 in the upper layer superposed directly on a metal wire 30 in the lower layer. The metal wires 30 may be wound in multiple layers with a metal wire 30 in the upper layer positioned between a metal wire 30 and a metal wire 30 in the lower layer as shown in the example of FIG. 4. Furthermore, a continuous groove 15 for guiding the metal wires 30 may be formed on the outer surface of the inner cylinder 12 as shown in FIG. 4. The continuous groove 15 is formed in a spiral line from the front end to the rear end of the inner cylinder 12 where the metal wires 30 are wound. The continuous groove 15 is particularly useful to prevent slipping when the metal wires 30 are wound around a conical section out of a cylindrical section and a conical section of the inner cylinder 12. The continuous groove 15 can be formed by mechanical cutting.

The sealing layer 16 is formed by the metal wires 30 wound in a single layer or multiple layers as described above. However, the leakage of the cooling fluid cannot be prevented by merely wound metal wires 30 even when they are wound without any gap and in any number of layers. Therefore, according to the combustor 4, to which the present disclosure is applied, the sealing layer 16 is formed by a bonded body in which the metal wires 30 are bonded to each other by metallurgical bonding. In addition, the metal wires 30 constituting the sealing layer 16 are bonded to the inner cylinder 12 by metallurgical bonding. By metallurgically bonding the metal wires 30 to each other and metallurgically bonding the metal wires 30 and the inner cylinder 12, it is possible to seal the cooling fluid flow path 14 with high reliability.

Hereinafter, two embodiments of an example of a configuration of the sealing layer 16 of the combustor 4 and a method for manufacturing the combustor 4 are described specifically.

2. First Embodiment

Figure 5:
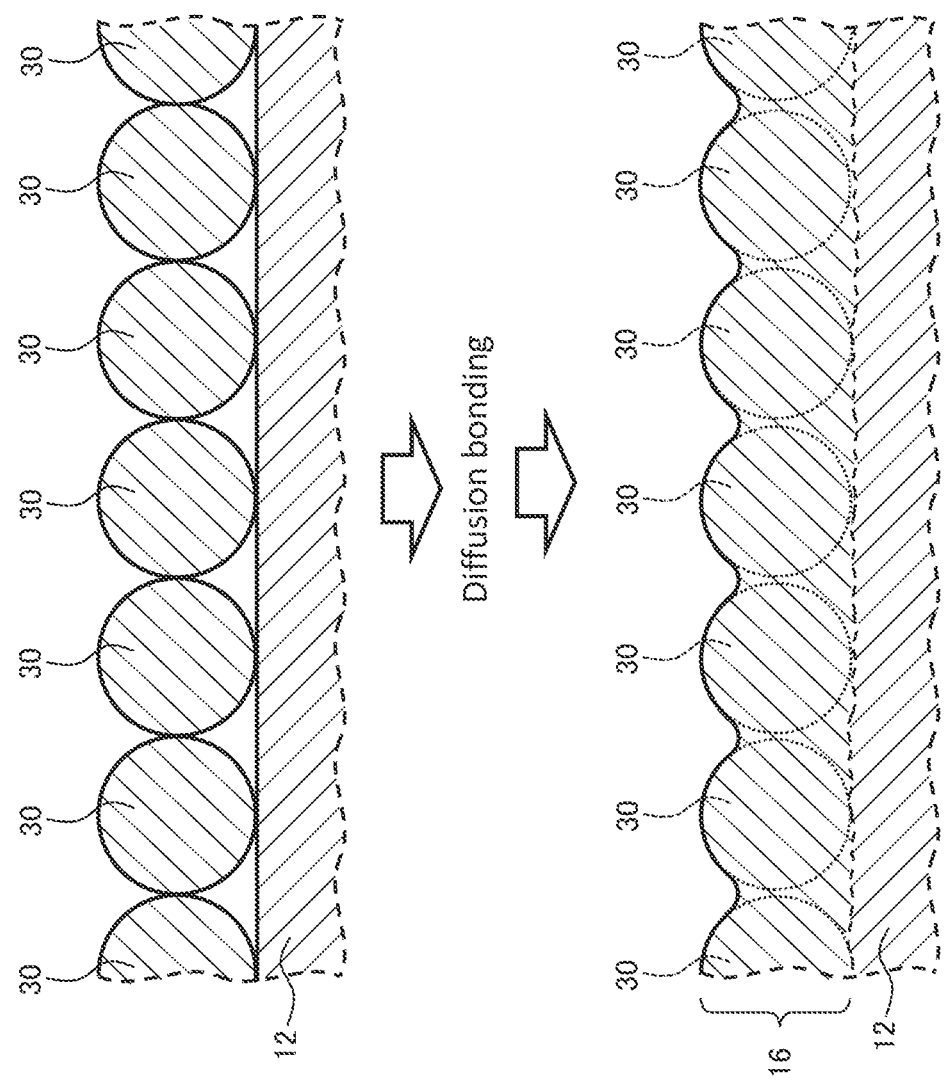
FIG. 5 is a schematic diagram showing an example of a configuration of a sealing layer of a combustor according to the first embodiment of the present disclosure.

FIG. 5 is a schematic diagram showing an example of a configuration of the sealing layer 16 of the combustor 4 according to the first embodiment. In the first embodiment, the metal wires 30 are wound around the outer surface of the inner cylinder 12 as it is. While the metal wires 30 are formed in a single layer in the example shown in FIG. 5 in order to simplify the explanation, the number of layers of the metal wires 30 is determined according to a condition such as required thickness of the sealing layer 16.

In the first embodiment, the metallurgical bonding to bond the metal wires 30 to each other and bond the metal wires 30 to the inner cylinder 12 is diffusion bonding. By heating the inner cylinder 12 around which the metal wires 30 are wound to a temperature equal to or higher than the diffusion temperature of the metal wires 30, the metal wires 30 are bonded to each other by diffusion sintering, meanwhile the metal wires 30 and the inner cylinder 12 are also bonded by diffusion sintering. Thus the sealing layer 16 is formed by a sintered body obtained by the diffusion sintering of the metal wires 30. Since the sealing layer 16 is also bonded to the inner cylinder 12 by diffusion sintering, it has no gap, and can seal the cooling fluid flow path 14 with high reliability.

In the first embodiment, the opening of the cooling fluid flow path 14 is covered with a sintered body of the metal wires 30 constituting the sealing layer 16. Since the cooling fluid flow path 14 has a cross section whose shape is narrow and vertically long, the ratio of area of the cover formed by the sealing layer 16 to entire area of the inner surface of the cooling fluid flow path 14 is low. Therefore, although the surface of the cover formed by the sealing layer 16 is not smooth, an increase in pressure loss due to the influence thereof does not cause a remarkable problem.

Figure 6:
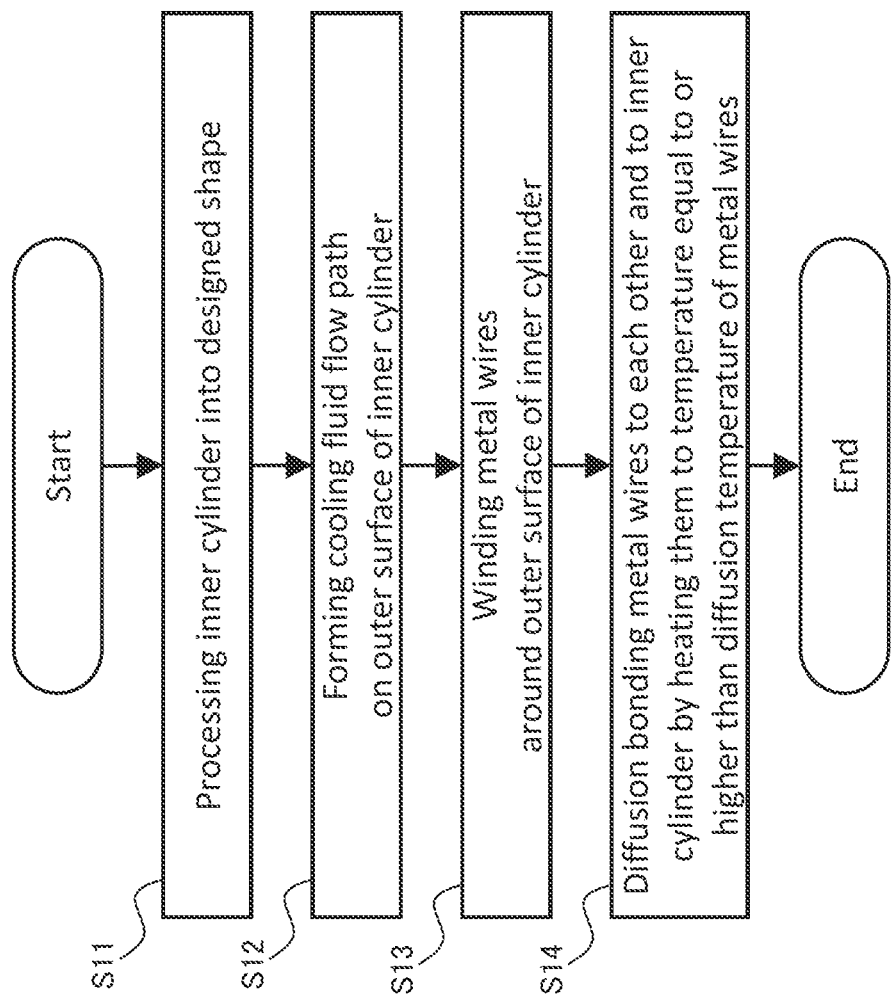
FIG. 6 is a flowchart showing a method for manufacturing a combustor according to the first embodiment of the present disclosure.

FIG. 6 is a flowchart showing a method for manufacturing the combustor 4 according to the first embodiment. First, in step S11, the inner cylinder 12 is processed into a designed shape. The designed shape is determined by performance required for the rocket engine 2. Basically, the present disclosure is applicable to a combustor 4 having an inner cylinder 12 of any designed shape.

In step S12, the cooling fluid flow path 14 is formed on the outer surface of the inner cylinder 12. The cooling fluid flow path 14 is formed by, for example, mechanical cutting. The cooling fluid flow path 14 is a groove extending in the axial direction of the inner cylinder 12, and large number of cooling fluid flow paths 14 are formed at equal intervals around the entire circumference of the inner cylinder 12.

In step S13, the metal wires 30 are wound around the outer surface of the inner cylinder 12, on which the cooling fluid flow path 14 is formed. The metal wires 30 are wound from the front end to the rear end of the inner cylinder 12 so as to cover all the openings of the cooling fluid flow path 14 and are repeatedly wound in layers until the thickness of the sealing layer 16 reaches required thickness. The metal wires 30 are wound under a predetermined tension so as to prevent the metal wires 30 from winding down. Particularly, the metal wires 30 are wound under tension around a curving section since the metal wires 30 can easily wind down at the section.

In step S14, the inner cylinder 12, around which the metal wires 30 are wound, is heated to a temperature equal to or higher than the diffusion temperature of the metal wires 30. It is heated in a reducing atmosphere such as a hydrogen atmosphere. By heated like this, the metal wires 30 are diffusion-bonded to each other and to the inner cylinder 12 to form the sealing layer 16 sealing the cooling fluid flow path 14. After the sealing layer 16 is formed, the outer cylinder 18 is attached so as to adhere to the surface of the sealing layer 16 to hold the inner cylinder 12.

3. Second Embodiment

Figure 7:
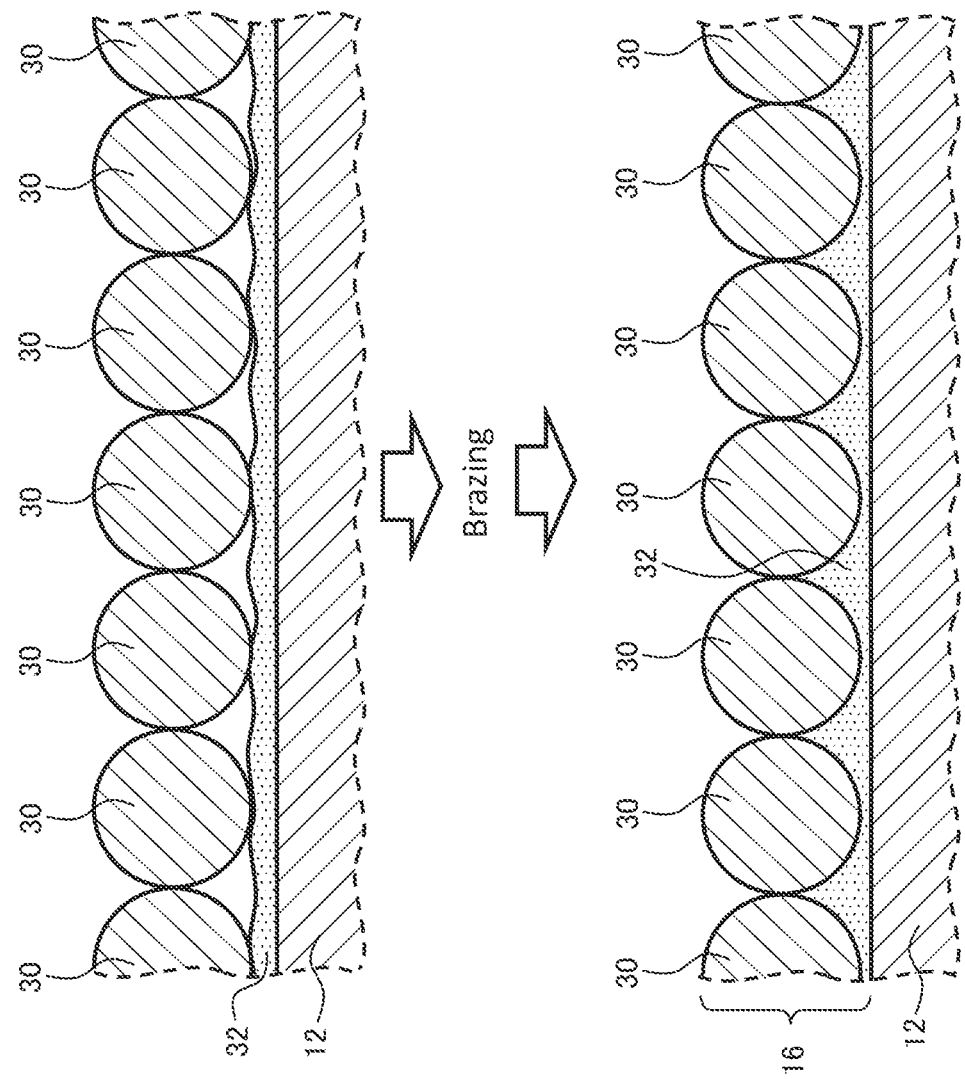
FIG. 7 is a schematic diagram showing the first example of a configuration of a sealing layer of a combustor according to the second embodiment of the present disclosure.

FIG. 7 is a schematic diagram showing the first example of a configuration of the sealing layer 16 of the combustor 4 according to the second embodiment. In the first example, solder material 32 is sticked to the outer surface of the inner cylinder 12, and metal wires 30 are wound around the outer surface of the inner cylinder 12, to which the solder material 32 is sticked. The solder material 32 may be silver, for example, and can be sticked to the outer surface of the inner cylinder 12 by plating. While in the example shown in FIG. 7, the metal wires 30 are formed in a single layer in order to simplify the explanation, the number of layers of the metal wires 30 is determined according to a condition such as required thickness of the sealing layer 16.

Figure 8:
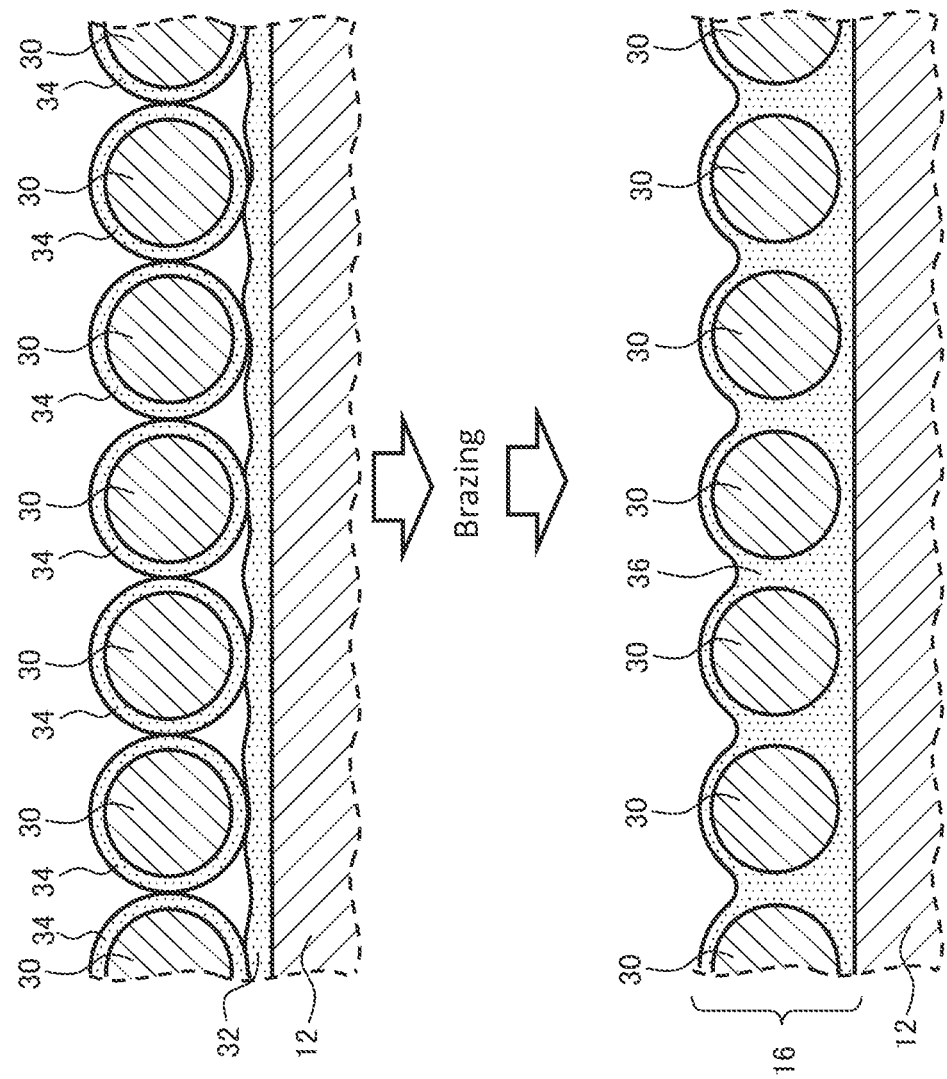
FIG. 8 is a schematic diagram showing the second example of a configuration of a sealing layer of a combustor according to the second embodiment of the present disclosure.

FIG. 8 is a schematic diagram showing the second example of a configuration of the sealing layer 16 of the combustor 4 according to the second embodiment. In the second example, solder material 32 is sticked to the outer surface of the inner cylinder 12, meanwhile solder material 34 is also sticked to the surface of the metal wires 30, and the metal wires 30, to which the solder material 34 is sticked, are wound around the outer surface of the inner cylinder 12, to which the solder material 32 is sticked. The solder material 32 and 34 may be silver, for example, and can be sticked to the outer surface of the inner cylinder 12 and the metal wires 30 by plating. The solder material 32 and the solder material 34 are preferably made of the same material, but may be made of different material as long as they can be bonded to each other and do not generate a brittle intermetallic compound by a heat process. While in the example shown in FIG. 8, the metal wires 30 are formed in a single layer in order to simplify the explanation, the number of layers of the metal wires 30 is determined according to a condition such as required thickness of the sealing layer 16.

In the second embodiment, the metallurgical bonding to bond the metal wires 30 to each other and bond the metal wires 30 to the inner cylinder 12 is brazing. In the first example shown in FIG. 7, the metal wires 30 are brazed to each other by the solder material 32 by heating the inner cylinder 12 around which the metal wires 30 are wound to a temperature equal to or higher than the melting temperature of the solder material 32. The sealing layer 16 formed by brazing the metal wires 30 is also brazed to the inner cylinder 12 by the solder material 32. The sealing layer 16 configured in this way can seal the cooling fluid flow path 14 without gaps and with high reliability.

In the second example shown in FIG. 8, the inner cylinder 12 around which the metal wires 30 are wound is heated to a temperature equal to or higher than the melting temperature of the solder material 32 and 34. The metal wires 30 are brazed to each other by solder material 36, which is obtained by melting and mixing the solder material 32 and 34. The sealing layer 16 formed by brazing the metal wires 30 to each other is also brazed to the inner cylinder 12 by the solder material 36. The sealing layer 16 configured in this way can seal the cooling fluid flow path 14 without gaps and with high reliability.

In the second embodiment, the opening of the cooling fluid flow path 14 is covered with the metal wires 30 and the solder material 32 or 36 constituting the sealing layer 16. Since the cooling fluid flow path 14 has a cross section whose shape is narrow and vertically long, the ratio of area of the cover formed by the sealing layer 16 to entire area of the inner surface of the cooling fluid flow path 14 is low. Therefore, although the surface of the cover formed by the sealing layer 16 is not smooth, an increase in pressure loss due to the influence thereof does not cause a remarkable problem.

Figure 9:
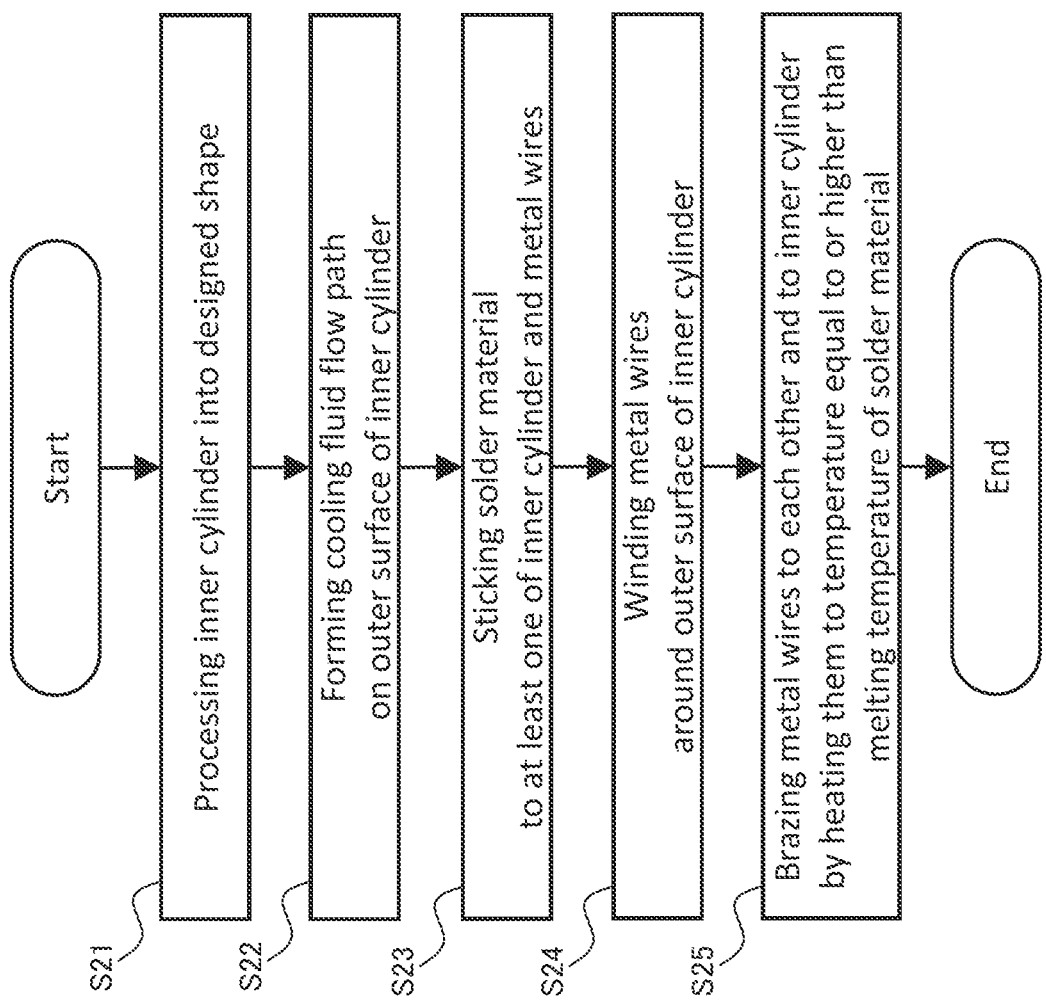
FIG. 9 is a flowchart showing a method for manufacturing a combustor according to the second embodiment of the present disclosure.

FIG. 9 is a flowchart showing a method for manufacturing the combustor 4 according to the second embodiment. First, in step S21, the inner cylinder 12 is processed into a designed shape. The designed shape is determined by performance required for the rocket engine 2. Basically, the present disclosure is applicable to a combustor 4 having an inner cylinder 12 of any designed shape.

In step S22, the cooling fluid flow path 14 is formed on the outer surface of the inner cylinder 12. The cooling fluid flow path 14 is formed by, for example, mechanical cutting.

The cooling fluid flow path 14 is a groove extending in the axial direction of the inner cylinder 12, and large number of cooling fluid flow paths 14 are formed at equal intervals around the entire circumference of the inner cylinder 12.

In step S23, solder material is sticked to at least one of the outer surface of the inner cylinder 12 and the metal wires 30. The solder material 32 is sticked to the outer surface of the inner cylinder 12 in the example shown in FIG. 7, and the solder material 32 and 34 are sticked to the outer surface of the inner cylinder 12 and the metal wires 30 respectively in the example shown in FIG. 8. In addition to them, the solder material may be sticked only to the metal wires 30.

In step S24, the metal wires 30 are wound around the outer surface of the inner cylinder 12, on which the cooling fluid flow path 14 is formed. The metal wires 30 are wound from the front end to the rear end of the inner cylinder 12 so as to cover all the openings of the cooling fluid flow path 14 and are repeatedly wound in layers until the thickness of the sealing layer 16 reaches required thickness. The metal wires 30 are wound under a predetermined tension so as to prevent the metal wires 30 from winding down. Particularly, the metal wires 30 are wound under tension around a curving section since the metal wires 30 can easily wind down at the section.

In step S25, the inner cylinder 12, around which the metal wires 30 are wound, is heated to a temperature equal to or higher than the melting temperature of the solder material 32 and 34. However, the temperature is made to be lower than the diffusion temperature of the metal wires 30. It is heated in a reducing atmosphere such as a hydrogen atmosphere. By heated like this, the metal wires 30 are brazed to each other and to the inner cylinder 12 by the solder material 32 or 36 to form the sealing layer 16 sealing the cooling fluid flow path 14. After the sealing layer 16 is formed, the outer cylinder 18 is attached so as to adhere to the surface of the sealing layer 16 to hold the inner cylinder 12.

4. How to Wind Metal Wires

Figure 10:
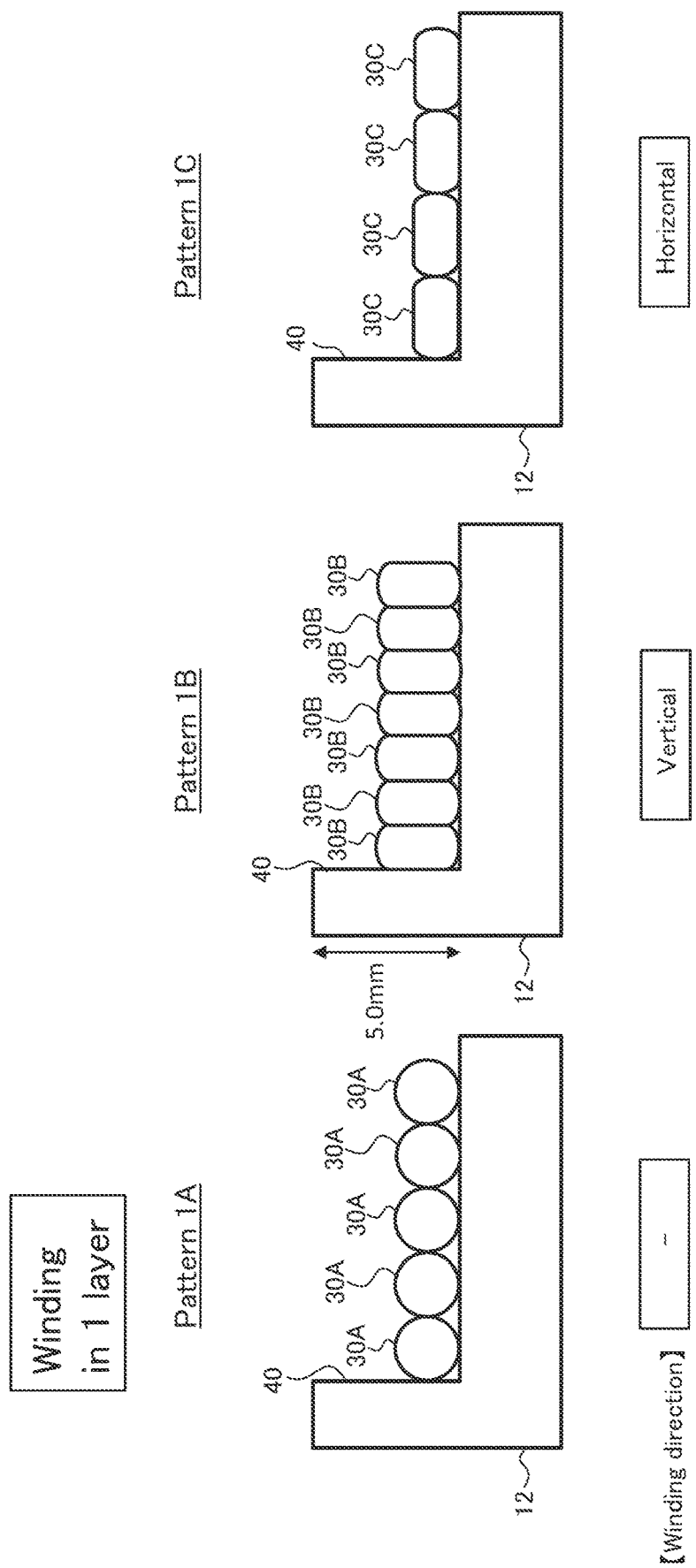
FIG. 10 is a diagram showing a method of winding a metal wire into one layer.
Figure 11:
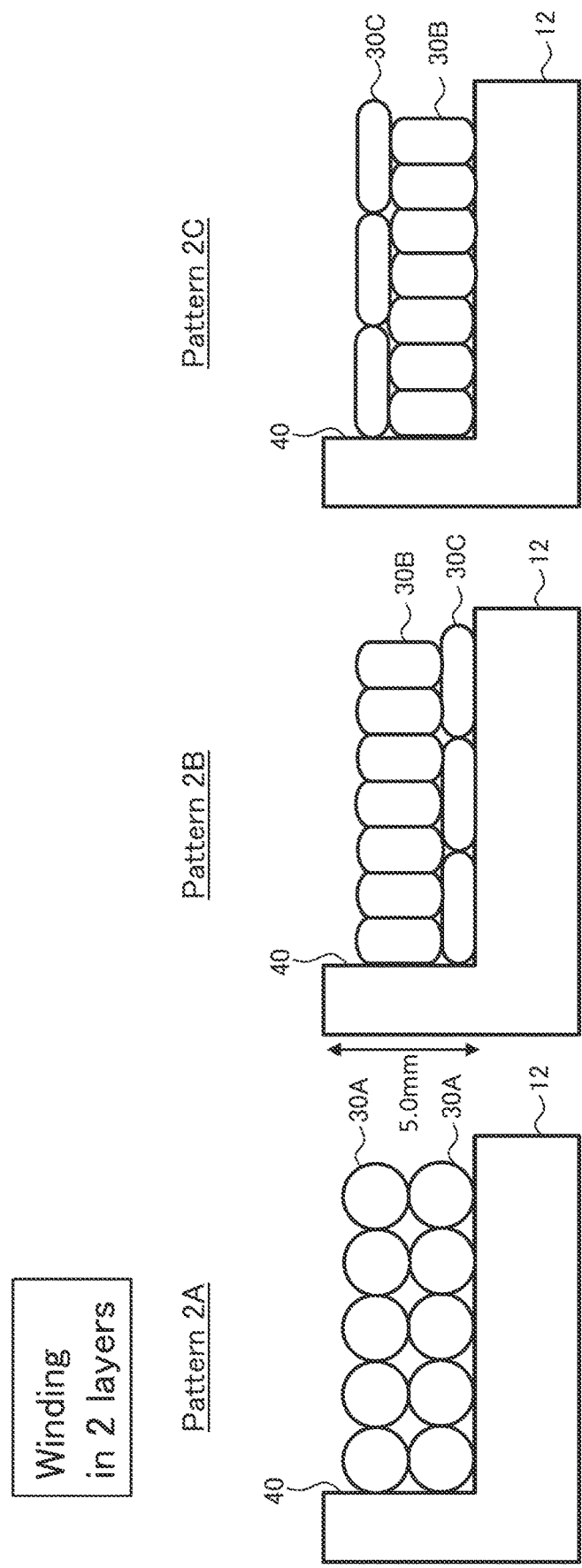
FIG. 11 is a diagram showing a method of winding a metal wire into two layers.
Figure 12:
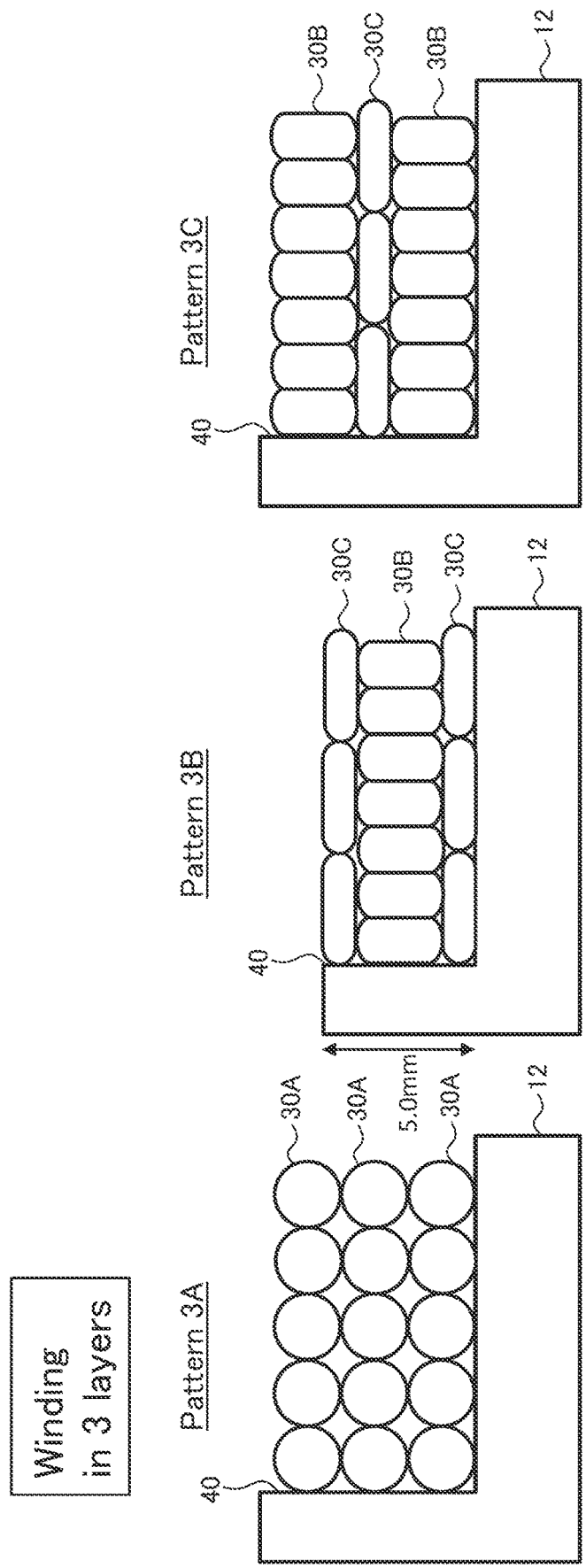
FIG. 12 is a diagram showing a method of winding a metal wire into three layers.

Here, it is described how the metal wires 30 are wound around the outer surface of the inner cylinder 12 with reference to FIG. 10 to 12. FIG. 10 shows an example of winding the metal wires 30 in one layer, FIG. 11 shows an example of winding the metal wires 30 in two layers, and FIG. 12 shows an example of winding the metal wires 30 in three layers. The metal wires 30 may be wound in more layers depending on the relationship between the thickness of the metal wires 30 and required thickness of the sealing layer 16. The metal wires 30 can be wound in more layers by appropriate combination of how the metal wires 30 are wound in one to three layers shown here.

In FIG. 10, three patterns 1A, 1B and 1C are exemplified to show how the metal wires 30 are wound in one layer. In the pattern 1A, circular metal wires 30A are wound around the outer surface of the inner cylinder 12. In the pattern 1B, flat circular metal wires 30B are wound around the outer surface of the inner cylinder 12 with their long side being vertical. In the pattern 1C, flat circular metal wires 30C are wound around the outer surface of the inner cylinder 12 with their long side being horizontal. In this specification, the winding direction exemplified in the pattern 1B is referred to as a vertical winding direction, and the winding direction exemplified in the pattern 1C is referred to as a horizontal winding direction. In a case of metal wires having a long side and a short side such as an ellipse or a rectangle, a vertical or horizontal winding direction is selected. On the other hand, in a case of metal wires not having a long side or a short side such as a circle, they have no winding direction.

As shown in FIG. 10, pressing walls 40 are formed at the front end and at the rear end on the outer surface of the inner cylinder 12. A pressing wall 40 is used when the metal wires 30 (30A, 30B, 30C in the example shown in FIG. 10) are wound around the outer surface of the inner cylinder 12. By winding the metal wires 30 pressing them against the pressing wall 40, the metal wires 30 can be wound without a gap. The pressing wall 40 can be formed by mechanical cutting. The height of the pressing wall 40 is, for example, 5 mm as shown in Fig.

In FIG. 11, three patterns 2A, 2B and 2C are exemplified to show how the metal wires 30 are wound in two layers. In the pattern 2A, circular metal wires 30A are wound in two layers on the outer surface of the inner cylinder 12. Here, a metal wire 30A in the second layer is disposed directly above the metal wire 30A in the first layer, but a metal wire 30A in the second layer may be disposed between two metal wires 30A and 30A in the first layer. In the pattern 2B, flat circular metal wires 30C are wound with their long side being horizontal in the first layer, and flat circular metal wires 30B are wound with their long side being vertical in the second layer. In the pattern 2C, flat circular metal wires 30B are wound with their long side being vertical in the first layer, and flat circular metal wires 30C are wound with their long side being horizontal in the second layer.

In FIG. 12, three patterns 3A, 3B and 3C are exemplified to show how the metal wires 30 are wound in three layers. In the pattern 3A, the circular metal wires 30A are wound around the outer surface of the inner cylinder 12 in three layers. While a metal wire 30A in the second layer and a metal wire 30A in the third layer are disposed directly above a metal wire 30A in the first layer, a metal wire 30A in the second layer may be horizontally shifted so that a metal wire 30A in the second layer is disposed between two metal wires 30A in the first layer and a metal wire 30A in the third layer is disposed between two metal wires 30A in the second layer. In the pattern 3B, flat circular metal wires 30C are wound with their long sides being horizontal in the first layer and in the third layer, and flat circular metal wires 30C are wound with their long sides being vertical in the second layer. In the pattern 3C, flat circular metal wires 30C are wound with their long sides being vertical in the first layer and in the third layer, and flat circular metal wires 30C are wound with their long sides being horizontal in the second layer. By alternately changing the winding direction in each layer like this, it is possible to suppress generation of a gap between layers.

Examples of Performance
(Water Pressure Resistance/Airtightness Test)

In each example and comparative example, a combustor in which a cooling fluid flow path was sealed was manufactured by metallurgically bonding metal wires to each other and metallurgically bonding metal wires to an inner cylinder. An outer cylinder made of stainless steel to hold the inner cylinder was manufactured by the bisection method by machining, and then an outer surface of the combustor was held by the outer cylinder. Then, water was made to flow through the cooling fluid flow path of the combustor, and it was kept under pressure of 2.0 MPa for 10 minutes and it was observed whether decrease in pressure occurred. In addition, thickness and sintering rate of a sealing layer were also measured.

In common to all examples and comparative examples, an inner cylinder constituting a combustor had a regularly designed shape. Size relating to an inner cylinder such as an outer diameter was common to all examples and comparative examples, and the number and cross-sectional shapes of cooling fluid flow paths formed on an inner cylinder were also common to all examples and comparative examples. After columnar material of copper alloy was machined into the designed shape of an inner cylinder, a plurality of cooling fluid flow paths were machined on an outer surface thereof. A shape (particularly, width) of a flow path varies depending on a position in axial direction of an inner cylinder, and width is narrowest at a constricted section between a combustion chamber and a nozzle. In the examples of performance, a flow path at a constricted section was formed into a shape 1.2 mm wide and 3.0 mm deep.

A metal wire for a seal was a phosphorus bronze wire because an inner cylinder was made of copper alloy. A cross-sectional shape of a metal wire was a circle, a rectangle, or an ellipse. Aspect ratio of a long side to a short side of a rectangular metal wire was 10:3. Aspect ratio of a long side to a short side of an elliptical metal wire was 10:3.

In an example in which the diffusion bonding process was performed, a temperature was raised in a hydrogen atmosphere for two hours with the highest temperature being 900 degrees C., which is a temperature equal to or higher than the diffusion temperature of a phosphor bronze wire. In an example in which the brazing process was performed, an outer surface of an inner cylinder in which a cooling fluid flow path was formed was plated with silver, which was solder material, with a thickness of 10 μm. Then, a temperature was raised in a hydrogen atmosphere for one hour with the highest temperature being 780 degrees C., which is a temperature equal to or higher than the melting temperature of silver.

Example 1

The inner cylinder was made of Cu—Cr—Zr alloy. The metal wires having circular cross-sectional shapes and long sides of 0.5 mm were used. A method for bonding the metal wires to each other and bonding the metal wires to the inner cylinder was diffusion bonding. As a result of performing the airtightness test after the water pressure resistance test, decrease in pressure was not observed.

Example 2

The inner cylinder was made of Cu—Cr—Zr alloy. The metal wires having polygonal cross-sectional shapes and long sides of 1.0 mm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 3

The inner cylinder was made of Cu—Cr—Zr alloy. The metal wires having elliptical cross-sectional shapes and long sides of 1.0 mm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 4

The inner cylinder was made of Cu—Cr—Zr alloy. The metal wires having circular cross-sectional shapes and long sides of 0.5 mm were used. A method for bonding the metal wires to each other and bonding the metal wires to the inner cylinder was brazing. As a result of performing the airtightness test after the water pressure resistance test, decrease in pressure was not observed.

Example 5

The inner cylinder was made of Cu—Cr—Zr alloy. The metal wires having polygonal cross-sectional shapes and long sides of 1.0 mm were used with their winding direction being horizontal. A method for bonding the metal wires to each other and bonding the metal wires to the inner cylinder was brazing. As a result of performing the airtightness test after the water pressure resistance test, decrease in pressure was not observed.

Example 6

The inner cylinder was made of Cu—Cr—Zr alloy. The metal wires having elliptical cross-sectional shapes and long sides of 1.0 mm were used with their winding direction being horizontal. A method for bonding the metal wires to each other and bonding the metal wires to the inner cylinder was brazing. As a result of performing the airtightness test after the water pressure resistance test, decrease in pressure was not observed.

The details and evaluation results according to the methods of manufacturing the combustors of Examples 1 to 6 are shown in Table 1.

TABLE 1

| | Inner cylinder | | | Sealing wire | | | |
| --- | --- | --- | --- | --- | --- | --- | --- |
| | Outer diameter | Material | Solder material | Material | Cross-sectional shape | Long side | Winding direction |
| Example 1 | Φ226 | Cu—Cr—Zr | — | Phosphorus bronze wire (C5212W) | Circular | 0.5 mm | — |
| Example 2 | Φ226 | Cu—Cr—Zr | — | Phosphorus bronze wire (C5213W) | Polygonal | 1.0 mm | Horizontal |
| Example 3 | Φ226 | Cu—Cr—Zr | — | Phosphorus bronze wire (C5214W) | Elliptical | 1.0 mm | Horizontal |

TABLE 1-continued

| | | | | | | | |
|---|---|---|---|---|---|---|---|
| Example 4 | Φ226 | Cu—Cr—Zr | Ag solder | Phosphorus bronze wire (C5215W) | Circular | 0.5 mm | — |
| Example 5 | Φ226 | Cu—Cr—Zr | Ag solder | Phosphorus bronze wire (C5216W) | Polygonal | 1.0 mm | Horizontal |
| Example 6 | Φ226 | Cu—Cr—Zr | Ag solder | Phosphorus bronze wire (C5217W) | Elliptical | 1.0 mm | Horizontal |

| | Heating condition | | | Sealing layer thickness | Sintering rate (%) | Water pressure resistance/ Airtightness |
|---|---|---|---|---|---|---|
| | Temperature (° C.) | Time (hrs) | Atmosphere | | | |
| Example 1 | 900 | 2 | H2 | 2.5 mm | 0.88 | Good |
| Example 2 | 900 | 2 | H2 | 2.0 mm | 0.93 | Good |
| Example 3 | 900 | 2 | H2 | 2.2 mm | 0.9 | Good |
| Example 4 | 780 | 1 | H2 | 3.0 mm | 0.82 | Good |
| Example 5 | 780 | 1 | H2 | 2.5 mm | 0.87 | Good |
| Example 6 | 780 | 1 | H2 | 2.8 mm | 0.85 | Good |

Example 7

The inner cylinder was made of Cu—Cr alloy. The metal wires having circular cross-sectional shapes and long sides of 20 μm were used. A method for bonding the metal wires to each other and bonding the metal wires to the inner cylinder was diffusion bonding. As a result of performing the airtightness test after the water pressure resistance test, decrease in pressure was not observed.

Example 8

The inner cylinder was made of Cu—Cr—Zr alloy. The metal wires having circular cross-sectional shapes and long sides of 200 μm were used. A method for bonding the metal wires to each other and bonding the metal wires to the inner cylinder was brazing. As a result of performing the airtightness test after the water pressure resistance test, decrease in pressure was not observed.

Example 9

The inner cylinder was made of Cu—Cr—Zr alloy. The metal wires having circular cross-sectional shapes and long sides of 380 μm were used. A method for bonding the metal wires to each other and bonding the metal wires to the inner cylinder was diffusion bonding. As a result of performing the airtightness test after the water pressure resistance test, decrease in pressure was not observed.

Example 10

The inner cylinder was made of Cu—Cr—Zr alloy. The metal wires having circular cross-sectional shapes and long sides of 2.0 mm were used. A method for bonding the metal wires to each other and bonding the metal wires to the inner cylinder was diffusion bonding. As a result of performing the airtightness test after the water pressure resistance test, decrease in pressure was not observed.

Example 11

The inner cylinder was made of Cu—Cr—Zr alloy. The metal wires having circular cross-sectional shapes and long sides of 3.4 mm were used. A method for bonding the metal wires to each other and bonding the metal wires to the inner cylinder was brazing. As a result of performing the airtightness test after the water pressure resistance test, decrease in pressure was not observed.

Example 12

The inner cylinder was made of Cu—Cr alloy. The metal wires having circular cross-sectional shapes and long sides of 5.1 mm were used. A method for bonding the metal wires to each other and bonding the metal wires to the inner cylinder was diffusion bonding. As a result of performing the airtightness test after the water pressure resistance test, decrease in pressure was not observed.

Example 13

The inner cylinder was made of Cu—Cr—Zr alloy. The metal wires having circular cross-sectional shapes and long sides of 6.6 mm were used. A method for bonding the metal wires to each other and bonding the metal wires to the inner cylinder was diffusion bonding. As a result of performing the airtightness test after the water pressure resistance test, decrease in pressure was not observed.

Example 14

The inner cylinder was made of Cu—Cr—Zr alloy. The metal wires having circular cross-sectional shapes and long sides of 8.1 mm were used. A method for bonding the metal wires to each other and bonding the metal wires to the inner cylinder was brazing. As a result of performing the airtightness test after the water pressure resistance test, decrease in pressure was not observed.

Example 15

The inner cylinder was made of Cu—Cr—Zr alloy. The metal wires having circular cross-sectional shapes and long sides of 9.5 mm were used. A method for bonding the metal wires to each other and bonding the metal wires to the inner cylinder was diffusion bonding. As a result of performing the airtightness test after the water pressure resistance test, decrease in pressure was not observed.

The details and evaluation results according to the methods of manufacturing the combustors of Examples 7 to 15 are shown in Table 2.

being horizontal. A method for bonding the metal wires to each other and bonding the metal wires to the inner cylinder was diffusion bonding. As a result of performing the airtightness test after the water pressure resistance test, decrease in pressure was not observed.

TABLE 2

|  | Inner cylinder | | | Sealing wire | | | |
|---|---|---|---|---|---|---|---|
|  | Outer diameter | Material | Solder material | Material | Cross-sectional shape | Long side | Winding direction |
| Example 7 | Φ226 | Cu—Cr | — | Phosphorus bronze wire (C5218W) | Circular | 20 μm | — |
| Example 8 | Φ226 | Cu—Cr—Zr | Ag solder | Phosphorus bronze wire (C5219W) | Circular | 200 μm | — |
| Example 9 | Φ226 | Cu—Cr—Zr | — | Phosphorus bronze wire (C5220W) | Circular | 380 μm | — |
| Example 10 | Φ226 | Cu—Cr—Zr | — | Phosphorus bronze wire (C5221W) | Circular | 2.0 mm | — |
| Example 11 | Φ226 | Cu—Cr—Zr | Ag solder | Phosphorus bronze wire (C5222W) | Circular | 3.4 mm | — |
| Example 12 | Φ226 | Cu—Cr | — | Phosphorus bronze wire (C5223W) | Circular | 5.1 mm | — |
| Example 13 | Φ226 | Cu—Cr—Zr | — | Phosphorus bronze wire (C5224W) | Circular | 6.6 mm | — |
| Example 14 | Φ226 | Cu—Cr—Zr | Ag solder | Phosphorus bronze wire (C5225W) | Circular | 8.1 mm | — |
| Example 15 | Φ226 | Cu—Cr | — | Phosphorus bronze wire (C5226W) | Circular | 9.5 mm | — |

|  | Heating condition | | | Evaluation results | | |
|---|---|---|---|---|---|---|
|  | Temperature (° C.) | Time (hrs) | Atmosphere | Sealing layer thickness | Sintering rate (%) | Water pressure resistance/ Airtightness |
| Example 7 | 900 | 2 | H2 | 2.0 mm | 0.93 | Good |
| Example 8 | 780 | 1 | H2 | 2.5 mm | 0.91 | Good |
| Example 9 | 900 | 2 | H2 | 2.8 mm | 0.86 | Good |
| Example 10 | 900 | 2 | H2 | 3.0 mm | 0.82 | Good |
| Example 11 | 780 | 1 | H2 | 3.1 mm | 0.81 | Good |
| Example 12 | 900 | 2 | H2 | 3.3 mm | 0.79 | Good |
| Example 13 | 900 | 2 | H2 | 3.4 mm | 0.77 | Good |
| Example 14 | 780 | 1 | H2 | 3.5 mm | 0.76 | Good |
| Example 15 | 900 | 2 | H2 | 3.6 mm | 0.75 | Good |

Example 16

The inner cylinder was made of Cu—Cr—Zr alloy. The metal wires having polygonal cross-sectional shapes and long sides of 30 μm were used with their winding direction being horizontal. A method for bonding the metal wires to each other and bonding the metal wires to the inner cylinder was brazing. As a result of performing the airtightness test after the water pressure resistance test, decrease in pressure was not observed.

Example 17

The inner cylinder was made of Cu—Cr—Zr alloy. The metal wires having polygonal cross-sectional shapes and long sides of 250 μm were used with their winding direction Example 18

The inner cylinder was made of Cu—Cr—Zr alloy. The metal wires having polygonal cross-sectional shapes and long sides of 420 μm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 19

The inner cylinder was made of Cu—Cr—Zr alloy. The metal wires having polygonal cross-sectional shapes and long sides of 710 μm were used with their winding direction being vertical. A method for bonding the metal wires to each other and bonding the metal wires to the inner cylinder was diffusion bonding. As a result of performing the airtightness test after the water pressure resistance test, decrease in pressure was not observed.

Example 20

The inner cylinder was made of Cu—Cr alloy. The metal wires having polygonal cross-sectional shapes and long sides of 3.3 mm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 21

The inner cylinder was made of Cu—Cr—Zr alloy. The metal wires having polygonal cross-sectional shapes and long sides of 5.0 mm were used with their winding direction being vertical. A method for bonding the metal wires to each other and bonding the metal wires to the inner cylinder was brazing. As a result of performing the airtightness test after the water pressure resistance test, decrease in pressure was not observed.

Example 22

The inner cylinder was made of Cu—Cr—Zr alloy. The metal wires having polygonal cross-sectional shapes and long sides of 6.4 mm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 23

The inner cylinder was made of Cu—Cr alloy. The metal wires having polygonal cross-sectional shapes and long sides of 7.8 mm were used with their winding direction being vertical. A method for bonding the metal wires to each other and bonding the metal wires to the inner cylinder was brazing. As a result of performing the airtightness test after the water pressure resistance test, decrease in pressure was not observed.

Example 24

The inner cylinder was made of Cu—Cr—Zr alloy. The metal wires having polygonal cross-sectional shapes and long sides of 9.3 mm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

The details and evaluation results according to the methods of manufacturing the combustors of Examples 16 to 24 are shown in Table 3.

TABLE 3

|  | Inner cylinder | | | Sealing wire | | | |
|---|---|---|---|---|---|---|---|
|  | Outer diameter | Material | Solder material | Material | Cross-section Shape | Long side | Winding direction |
| Example 16 | Φ226 | Cu—Cr—Zr | Ag solder | Phosphorus bronze wire (C5227W) | Polygonal | 30 μm | Horizontal |
| Example 17 | Φ226 | Cu—Cr—Zr | — | Phosphorus bronze wire (C5228W) | Polygonal | 250 μm | Horizontal |
| Example 18 | Φ226 | Cu—Cr | — | Phosphorus bronze wire (C5229W) | Polygonal | 420 μm | Horizontal |
| Example 19 | Φ226 | Cu—Cr—Zr | — | Phosphorus bronze wire (C5230W) | Polygonal | 710 μm | Vertical |
| Example 20 | Φ226 | Cu—Cr | — | Phosphorus bronze wire (C5231W) | Polygonal | 3.3 mm | Horizontal |
| Example 21 | Φ226 | Cu—Cr—Zr | Ag solder | Phosphorus bronze wire (C5232W) | Polygonal | 5.0 mm | Vertical |
| Example 22 | Φ226 | Cu—Cr—Zr | — | Phosphorus bronze wire (C5233W) | Polygonal | 6.4 mm | Horizontal |
| Example 23 | Φ226 | Cu—Cr | Ag solder | Phosphorus bronze wire (C5234W) | Polygonal | 7.8 mm | Vertical |
| Example 24 | Φ226 | Cu—Cr—Zr | — | Phosphorus bronze wire (C5235W) | Polygonal | 9.3 mm | Horizontal |

TABLE 3-continued

| | Heating condition | | | Evaluation results | | |
|---|---|---|---|---|---|---|
| | Temperature (° C.) | Time (hrs) | Atmosphere | Sealing layer Thickness | Sintering rate (%) | Water pressure resistance/ Airtightness |
| Example 16 | 780 | 1 | H2 | 1.8 mm | 0.95 | Good |
| Example 17 | 900 | 2 | H2 | 2.3 mm | 0.92 | Good |
| Example 18 | 900 | 2 | H2 | 2.7 mm | 0.87 | Good |
| Example 19 | 900 | 2 | H2 | 3.0 mm | 0.85 | Good |
| Example 20 | 900 | 2 | H2 | 3.0 mm | 0.82 | Good |
| Example 21 | 780 | 1 | H2 | 3.1 mm | 0.8 | Good |
| Example 22 | 900 | 2 | H2 | 3.2 mm | 0.79 | Good |
| Example 23 | 780 | 1 | H2 | 3.4 mm | 0.78 | Good |
| Example 24 | 900 | 2 | H2 | 3.4 mm | 0.77 | Good |

Example 25

The inner cylinder was made of Cu—Cr—Zr alloy. The metal wires having elliptical cross-sectional shapes and long sides of 50 μm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 26

The inner cylinder was made of Cu—Cr—Zr alloy. The metal wires having elliptical cross-sectional shapes and long sides of 280 μm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 27

The inner cylinder was made of Cu—Cr alloy. The metal wires having elliptical cross-sectional shapes and long sides of 450 μm were used with their winding direction being vertical. A method for bonding the metal wires to each other and bonding the metal wires to the inner cylinder was brazing. As a result of performing the airtightness test after the water pressure resistance test, decrease in pressure was not observed.

Example 28

The inner cylinder was made of Cu—Cr—Zr alloy. The metal wires having elliptical cross-sectional shapes and long sides of 750 μm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 29

The inner cylinder was made of Cu—Cr—Zr alloy. The metal wires having elliptical cross-sectional shapes and long sides of 3.1 mm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 30

The inner cylinder was made of Cu—Cr alloy. The metal wires having elliptical cross-sectional shapes and long sides of 4.8 mm were used with their winding direction being vertical. A method for bonding the metal wires to each other and bonding the metal wires to the inner cylinder was brazing. As a result of performing the airtightness test after the water pressure resistance test, decrease in pressure was not observed.

Example 31

The inner cylinder was made of Cu—Cr—Zr alloy. The metal wires having elliptical cross-sectional shapes and long sides of 6.1 mm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 32

The inner cylinder was made of Cu—Cr—Zr alloy. The metal wires having elliptical cross-sectional shapes and long sides of 7.5 mm were used with their winding direction being horizontal. A method for bonding the metal wires to each other and bonding the metal wires to the inner cylinder was diffusion bonding. As a result of performing the airtightness test after the water pressure resistance test, decrease in pressure was not observed.

Example 33

The inner cylinder was made of Cu—Cr alloy. The metal wires having elliptical cross-sectional shapes and long sides of 7.5 mm were used with their winding direction being vertical. A method for bonding the metal wires to each other and bonding the metal wires to the inner cylinder was brazing. As a result of performing the airtightness test after the water pressure resistance test, decrease in pressure was not observed.

The details and evaluation results according to the methods of manufacturing the combustors of Examples 25 to 33 are shown in Table 4.

Comparative Example 1

The inner cylinder was made of Cu—Cr—Zr alloy. The metal wires having circular cross-sectional shapes and long sides of 5 μm were used. However, a metal wire was broken because of the tension when the metal wires were wound around the inner cylinder, and the metal wires could not be wound around the inner cylinder.

Comparative Example 2

The inner cylinder was made of Cu—Cr—Zr alloy. The metal wires having circular cross-sectional shapes and long

TABLE 4

| | Inner cylinder | | | Sealing wire | | | |
|---|---|---|---|---|---|---|---|
| | Outer diameter | Material | Solder material | Material | Cross-section Shape | Long side | Winding direction |
| Example 25 | Φ226 | Cu—Cr—Zr | — | Phosphorus bronze wire (C5236W) | Elliptical | 50 μm | Horizontal |
| Example 26 | Φ226 | Cu—Cr—Zr | — | Phosphorus bronze wire (C5237W) | Elliptical | 280 μm | Horizontal |
| Example 27 | Φ226 | Cu—Cr | Ag solder | Phosphorus bronze wire (C5238W) | Elliptical | 450 μm | Vertical |
| Example 28 | Φ226 | Cu—Cr—Zr | — | Phosphorus bronze wire (C5239W) | Elliptical | 750 μm | Horizontal |
| Example 29 | Φ226 | Cu—Cr—Zr | — | Phosphorus bronze wire (C5240W) | Elliptical | 3.1 mm | Horizontal |
| Example 30 | Φ226 | Cu—Cr | Ag solder | Phosphorus bronze wire (C5241W) | Elliptical | 4.8 mm | Vertical |
| Example 31 | Φ226 | Cu—Cr—Zr | — | Phosphorus bronze wire (C5242W) | Elliptical | 6.1 mm | Horizontal |
| Example 32 | Φ226 | Cu—Cr | — | Phosphorus bronze wire (C5243W) | Elliptical | 7.5 mm | Horizontal |
| Example 33 | Φ226 | Cu—Cr—Zr | Ag solder | Phosphorus bronze wire (C5244W) | Elliptical | 9.0 mm | Vertical |

| | Heating condition | | | Evaluation results | | |
|---|---|---|---|---|---|---|
| | Temperature (°C.) | Time (hrs) | Atmosphere | Sealing layer Thickness | Sintering rate (%) | Water pressure resistance/ Airtightness |
| Example 25 | 900 | 2 | H2 | 1.9 mm | 0.94 | Good |
| Example 26 | 900 | 2 | H2 | 2.4 mm | 0.91 | Good |
| Example 27 | 780 | 1 | H2 | 2.8 mm | 0.86 | Good |
| Example 28 | 900 | 2 | H2 | 3.0 mm | 0.84 | Good |
| Example 29 | 900 | 2 | H2 | 3.1 mm | 0.81 | Good |
| Example 30 | 780 | 1 | H2 | 3.3 mm | 0.79 | Good |
| Example 31 | 900 | 2 | H2 | 3.3 mm | 0.78 | Good |
| Example 32 | 900 | 2 | H2 | 3.5 mm | 0.77 | Good |
| Example 33 | 780 | 1 | H2 | 3.6 mm | 0.76 | Good | sides of 12 mm were used. A method for bonding the metal wires to each other and bonding the metal wires to the inner cylinder was diffusion bonding. As a result of performing the airtightness test after the water pressure resistance test, decrease in pressure due to pressure leakage occurred.

The details and evaluation results according to the methods of manufacturing the combustors of Comparative Examples 1 and 2 are shown in Table 5.

TABLE 5

| | Inner cylinder | | | Sealing wire | | | |
|---|---|---|---|---|---|---|---|
| | Outer diameter | Material | Solder material | Material | Cross-section Shape | Long side | Winding direction |
| Comparative example 1 | Φ226 | Cu—Cr—Zr | — | Phosphorus bronze wire (C5246W) | Circular | 5 μm | — |
| Comparative example 1 | Φ226 | Cu—Cr—Zr | — | Phosphorus bronze wire (C5247W) | Circular | 12 mm | — |

| | Heating condition | | | Sealing layer Thickness | Sintering rate (%) | Water pressure resistance/ Airtightness |
|---|---|---|---|---|---|---|
| | Temperature (° C.) | Time (hrs) | Atmosphere | | | |
| Comparative example 1 | — | — | — | Wire breakage during winding | | |
| Comparative example 1 | 900 | 2 | H2 | 11 mm | — | Occurrence of leakage |

Discussion

According to the above-described Examples and Comparative Examples, it can be determined that one preferable range of a long side is from 10 μm to 10 mm with respect to thickness of a metal wire regardless of a cross-sectional shape of the metal wire and whether metal wires are diffusion-bonded or brazed.

What is claimed is:
1. A combustor for a rocket engine comprising:
an inner cylinder made of metal constituting a combustion chamber;
a cooling fluid flow path formed on an outer surface of the inner cylinder; and
a sealing layer covering the outer surface of the inner cylinder to seal the cooling fluid flow path,
wherein the sealing layer comprises a first layer of flat circular metal wires having long and short sides wound around the outer surface of the inner cylinder, the metal wires of the first layer being diffusion-bonded to each other via one side of the long and short sides and to the inner cylinder via the other side of the long and short sides so as to form one integrally bonded product.
2. The combustor according to claim 1, further comprising an outer cylinder adhering to a surface of the sealing layer to hold the inner cylinder.
3. The combustor according to claim 1, wherein the metal wires are diffusion-bonded without using a hot isostatic pressing method.
4. The combustor according to claim 1, wherein
the inner cylinder and the metal wires are made of copper alloy.
5. The combustor according to claim 1, wherein
the inner cylinder is formed as a single unit, and
the cooling fluid flow path is formed by mechanical cutting.
6. The combustor according to claim 1, wherein
the sealing layer further comprises a second layer of the metal wires of the second layer being wound around the first layer, the second layer being integrally diffusion-bonded to each other via the other side of the long and short sides and to the first layer via the one side of the long and short sides so as to form the one integrally bonded product.
7. A method for manufacturing a combustor for a rocket engine comprising:
forming a cooling fluid flow path on an outer surface of an inner cylinder made of metal that constitute a combustion chamber;
winding a first layer of flat circular metal wires having long and short sides around the outer surface of the inner cylinder; and
sealing the cooling fluid flow path by diffusion-bonding the metal wires of the first layer to each other via one side of the long and short sides and to the inner cylinder via the other side of the long and short sides by heating the inner cylinder, around which the metal wires are wound, to a temperature equal to or higher than a diffusion temperature of the metal wires so as to form one integrally bonded product.
8. The method according to claim 7, the method further comprising:
forming a continuous groove on the outer surface of the inner cylinder for guiding the metal wires.

9. The method according to claim 7, wherein the diffusion-bonding the metal wires is diffusion-bonding the metal wires by heating the inner cylinder to the temperature equal to or higher than the diffusion temperature of the metal wires without using a hot isostatic pressing method.

10. The method according to claim 7, wherein
the inner cylinder and the metal wires are made of copper alloy.

11. The method according to claim 7, wherein
the inner cylinder is formed as a single unit, and
the cooling fluid flow path is formed by mechanical cutting.

12. The method according to claim 7, the method further comprising:
winding the second layer of the metal wires around the first layer, and
sealing the cooling fluid flow path by diffusion-bonding the metal wires of the first layer to each other via the one side and to the inner cylinder via the other side, and diffusion-bonding the metal wires of the second layer to each other via the other side and to the first layer via the one side, by heating the inner cylinder, around which the metal wires are wound, to a temperature equal to or higher than the diffusion temperature of the metal wires so as to form the one integrally bonded product.

* * * * *